United States Patent Office 3,087,440
Patented Apr. 30, 1963

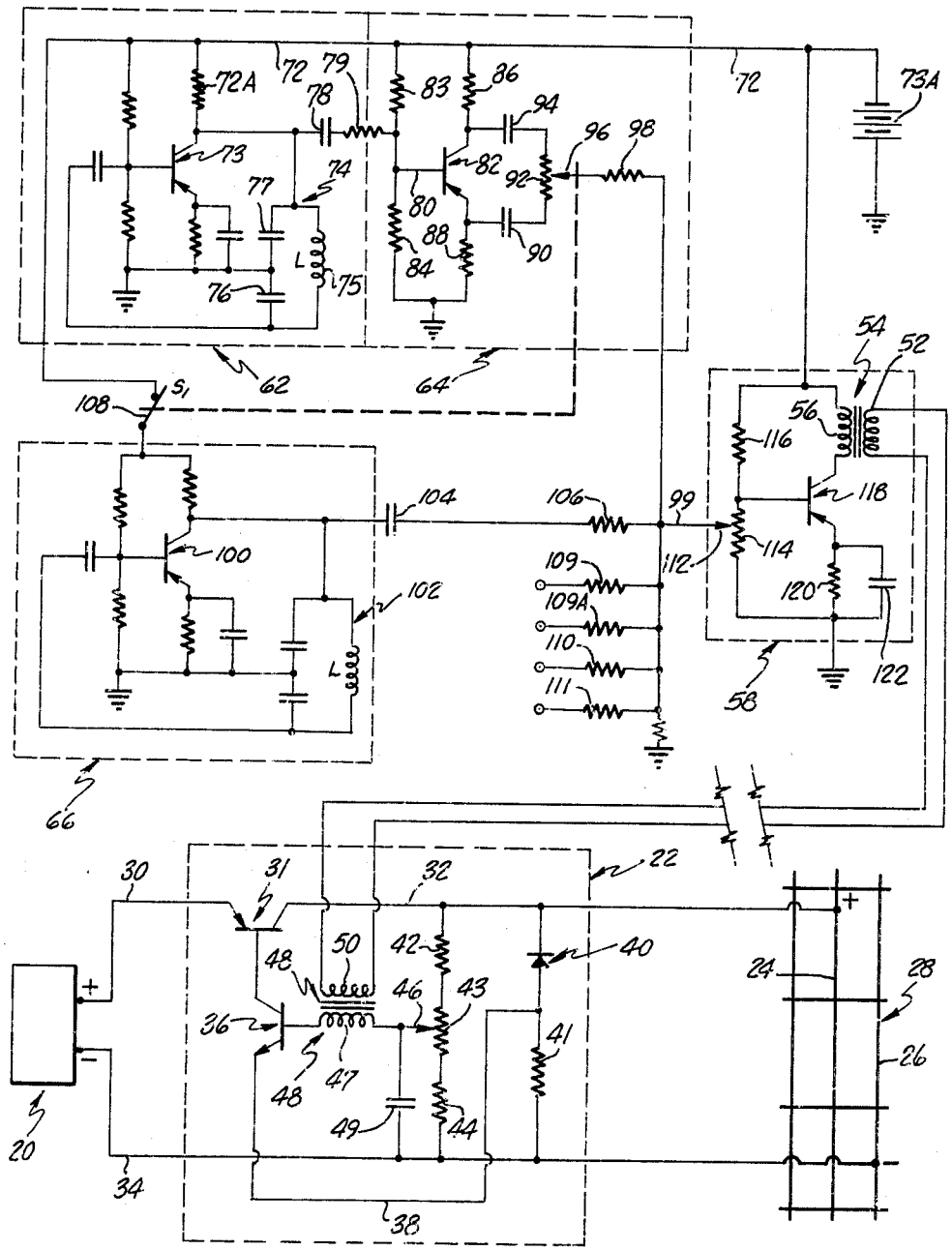
FIG_1
WILLIAM C. ZARNSTORFF
INVENTOR.
BY Christie, Parker & Hale
ATTORNEYS

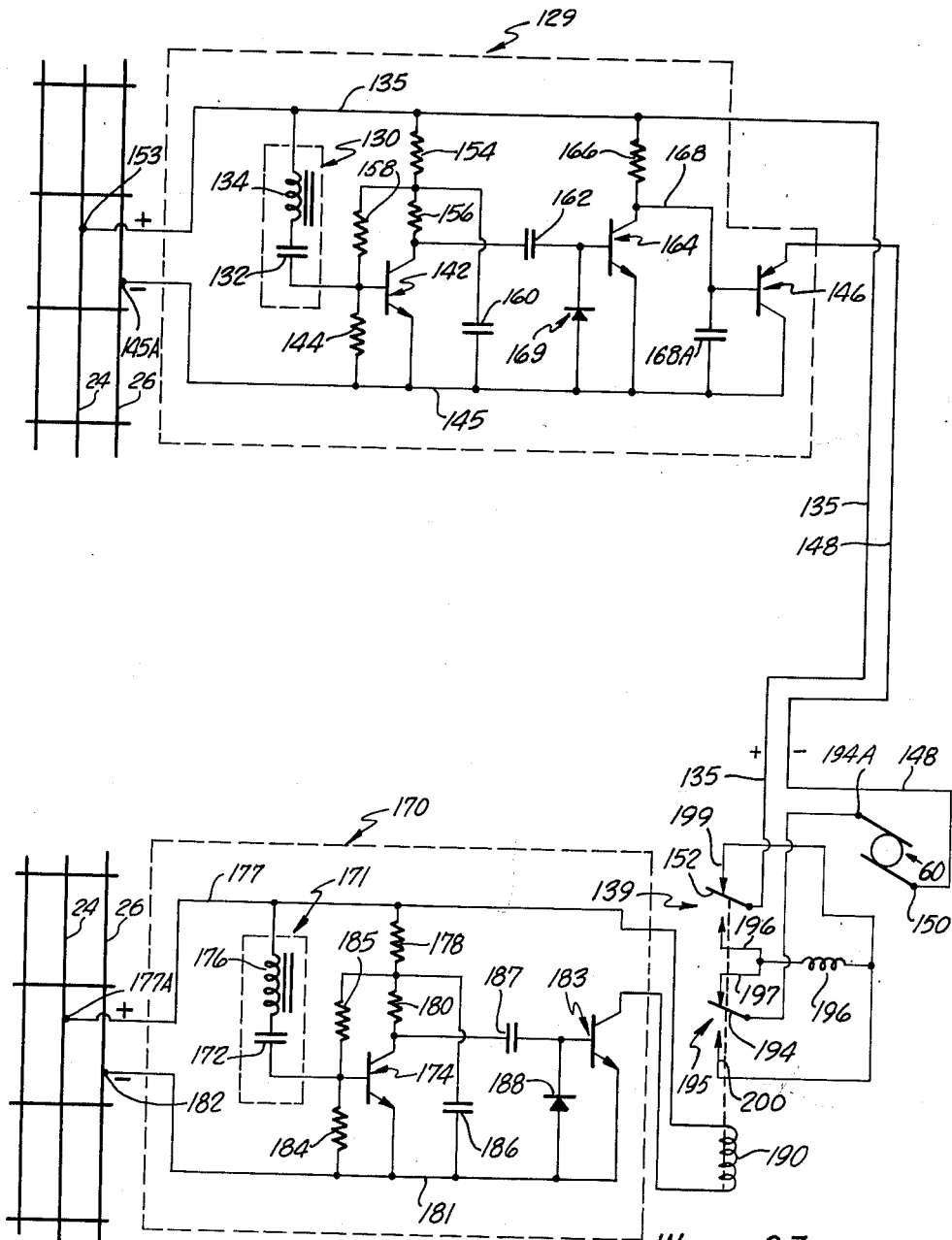
FIG_2
WILLIAM C. ZARNSTORFF
INVENTOR.
BY Christie Parker & Hale
ATTORNEYS

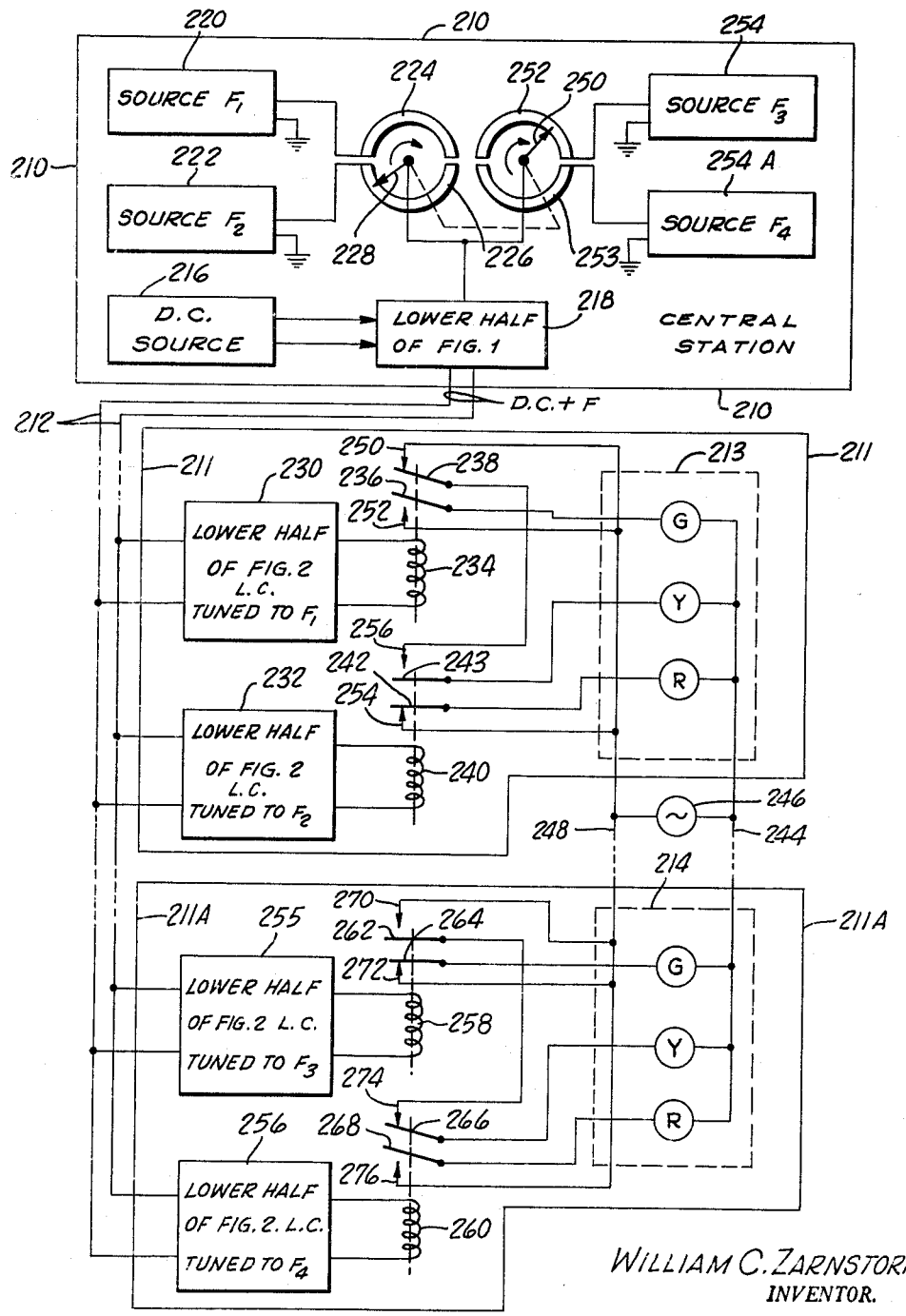

3,087,440
CONTROL CIRCUIT
William C. Zarnstorff, Madison, Wis., assignor to Wisconsin Alumni Research Foundation, Madison, Wis., a not for profit corporation of Wisconsin
Filed May 12, 1960, Ser. No. 28,662
8 Claims. (Cl. 104—152)

This invention provides a circuit for controlling the application of electric power to a plurality of devices at various remote locations from a central control location and with a minimum number of conductors.

The circuit of this invention is useful in many applications, such as controlling traffic lights on city streets, or controlling a large number of electric model trains running on a common track. For purposes of illustration, the invention is described as used in controlling model trains, although its uses in other applications will also be apparent.

Prior to this invention, individual control of a plurality of model trains running on a common track was achieved by dividing the track into electrically isolated sections. This method allowed, at most, control of only two trains on any one section of the track.

With the control circuit of this invention, a large number of trains can be controlled on a single, electrically continuous track.

Briefly, this circuit controls the supply of electric power to a load, say an electric motor for a model train engine, from a source of operating voltage. A variable impedance device, which may be a vacuum tube or a transistor, is connected to control the flow of electric power through the load. The impedance of the variable impedance device is in turn controlled by a control voltage superimposed on the operating voltage. The two voltages are of different frequencies, and means selectively responsive only to the control voltage is connected to the variable impedance device to alter its impedance in response to the control voltage.

Thus, in the preferred form of the invention, a plurality of loads, such as train engines, whistles, lights, relays, etc., may be connected to draw operating power from the operating voltage applied to an electrically continuous track. However, each load has a respective receiver arranged to be responsive only to its own control signal superimposed on the operating voltage, and this provides independent control of each load in response to the respective control signals.

Preferably, the operating voltage is direct current, and the control voltages are alternating current in the audio frequency range, the amplitudes of which control the respective impedances of variable impedance devices. Means are provided for equalizing the maximum amplitudes of the various control voltages to avoid the possibility of "cross talk," i.e., one control signal being so strong as to affect the impedance of some device other than the one it is intended to control.

These, and other aspects of the invention, will be more fully understood from the following detailed description taken with the accompanying drawings, in which:

FIG. 1 is a schematic diagram of circuits for applying the operating and control voltages to a model railroad track;

FIG. 2 is a schematic diagram of circuits for receiving the operating and control voltages and for controlling a model electric train engine; and FIG. 3 is a block diagram showing the use of the invention to control traffic lights.

Referring to FIG. 1, a source 20 of unregulated D.C. voltage is connected through a voltage regulator and tone modulator stage 22 to the middle and right (as viewed in the drawings) rails 24 and 26, respectively, of a 3-rail track 28. As shown in the drawings, the middle rail is positive and the right rail is negative.

In more detail, the D.C. voltage regulator and tone modulator stage includes a positive lead 30 connected at one end to the positive terminal of the unregulated D.C. source 20, and connected at its other end to the emitter of a first transistor 31. The collector of the first transistor is connected through a positive lead 32 to the middle rail of the track. A negative lead 34 is connected at one end to the negative terminal of the unregulated D.C. source, and at its other end to the right rail 26 of the track.

The collector of a second transistor 36 is connected to the base of the first transistor, and the emitter of the second transistor is connected through a lead 38 to the positive terminal of a Zener diode 40, which provides a reference voltage for the output of the regulator circuit. The negative terminal of the Zener diode is connected to the positive lead 32, and the positive terminal of the diode is connected to a first resistor 41, the other end of which is connected to the negative lead 34. Second, third, and fourth resistors, 42, 43, and 44, are connected in series across leads 32 and 34. A movable tap 46 is adapted to slide along the third resistor 43 and is connected through a secondary winding 47 of a first transformer 48 to the base of the second transistor 36. The movable tap 46 is also connected through a capacitor 49 to lead 34 to provide some by-passing and increase the gain of the circuit at audio frequencies. However, this capacitor can be omitted if desired.

The setting of the contact 46 on the resistor 43 determines the bias on the base of the second transistor 36, which in turn controls the bias on the first transistor 31, thereby providing means to adjust the regulated D.C. output voltage of the regulator, which is the operating voltage supplied to the track.

An alternating current control voltage, which preferably is in the audio frequency range, is superimposed on the D.C. voltage output of the regulator through a primary winding coil 50 of the first transformer 48. The primary winding 50 is connected to a secondary winding 52 of a second transformer 54, which includes a primary winding 56 connected in a mixer stage 58 as shown in the drawing.

When an audio frequency control voltage is applied to the primary winding 50 of the first transformer, it is coupled to the base of a second transistor 36, and amplified and direct coupled to the base of the first transistor 31. Since the collector and emitter of the first transistor are in series with the unregulated D.C. power source and the track, any current flowing to the track varies at the frequency of the audio control signal applied to the primary winding of the first transformer 48, and the amplitude of the audio frequency applied to the primary winding 50 of the first transformer 48 determines the amplitude of the audio frequency at the output of the D.C. voltage regulator.

Several variations of the D.C. voltage regulator and tone modulator circuit are possible. For example, the audio frequency input may be coupled into the second transistor with a simple RC coupling. Moreover, the modulation of the D.C. voltage is not limited to the specific circuits shown and mentioned, but may be used with any voltage regulating type circuit, whether transistor or vacuum tube.

The mixer stage 58 receives control voltages in the audio frequency range from a plurality of oscillators, only two of which are shown in detail in the drawing.

For the purpose of illustrating the invention, it is assumed that the speed and direction of an electric motor 60 (see FIG. 2) in a model electric train (not shown) is to be controlled. To achieve this result, a speed oscillator 62 has its output coupled to the input of a phase inverter 64, which may be of the conventional single-tube paraphase amplifier type, the output of which is fed into the mixer stage so the audio frequency control voltage for motor speed regulation is passed on to the voltage regulator and tone modulator stage where the audio frequency speed control signal is superimposed on the D.C. voltage supplied by the regulator. A reversing oscillator 66 is turned on only when the motor is to be run in a reverse direection, and its output supplied to the mixer stage an audio frequency control voltage which is passed on through the voltage regulator and tone modulator to the track to control the direction in which the motor 60 runs, as explained in detail below.

The speed oscillator is a conventional Colpitts oscillator arrangement having a negative lead 72 connected through a resistor 72A to the collector of a third transistor 73, and to the negative terminal of a D.C. source 73A, the positive terminal of which is grounded.

Oscillations are sustained by regenerative feedback to the base of the third transistor 73 from a tank circuit 74, which determines the oscillation frequency and includes the usual inductance 75 and capacitors 76, 77. Good sine wave oscillation depends on choosing the correct ratio of the value of capacitor 77 to that of capacitor 76. If the ratio is too small, the sine wave clips as the collector of transistor 73 bottoms in the extreme case. In the less extreme case, the sine wave would be distorted and unsymmetrical. On the other hand, when the ratio of the value of capacitor 77 to that of capacitor 76 is made large, the sine wave distortion decreases, but the amplitude of the collector swing also decreases. The optimum ratio of capacitor 77 to capacitor 76 generally varies from about 10 to about 50, depending on the transistor gain and the "Q" of the tuned tank circuit 74.

The output of the speed oscillator is coupled through a capacitor 78 and an isolation resistor 79 to the input of the phase inverter 64, which is the base 80 of a fourth transistor 82. The isolation resistor 79 minimizes the loading of the speed oscillator by the phase inverter. The base of the transistor 80 is connected through a resistor 83 to the negative lead 72, and also through a resistor 84 to ground. The collector of the fourth transistor is connected through a resistor 86 to the negative lead 72, and the emitter of the fourth transistor is connected through a resistor 88 to ground. Resistors 86 and 88 are equal in value. The emitter of the fourth transistor 82 is also connected through a capacitor 90 to one end of a speed control potentiometer resistor 92, and the collector of the fourth transistor is coupled through a capacitor 94 to the other end of the speed control resistor 92. As a result, the speed control potentiometer resistor is fed with two out-of-phase signals to opposite ends so that at the mid point of the speed control resistor there is no output. An adjustable tap 96 is adapted to slide along the speed control resistor 92 and supply a speed control audio frequency signal through a resistor 98 to the input 99 of the mixer stage.

The reversing oscillator 66 is similar to the speed oscillator, but is set to oscillate at a substantially different frequency. The oscillator 66 includes a fifth transistor 100, which is driven by the regenerative feedback of a tank circuit 102. The output of the reversing oscillator is coupled through a capacitor 104 and a resistor 106 to the input 99 of the mixer stage. The reversing oscillator is turned on through operation of a microswitch 108, which is closed by movement of the contact 96 down from the mid position of the speed control resistor 92 in the phase inverter output. With this arrangement, complete control of the train motor is obtained with a single control knob.

The outputs of other oscillators (not shown) for the motors of other trains (not shown) are fed into the mixer stage through resistors 109, 109A, 110, 111, etc. The additional oscillators can be used to control other functions such as whistles, smoke generation, lights, railroad track switches, etc., if desired.

Control signals applied to the mixer stage from the various oscillators should be of uniform maximum amplitude to avoid "cross talk," i.e., to avoid inadvertent operation of one channel by excessive power or amplitude of a control frequency intended to operate only some other channel. For this reason, the mixer stage input resistors 98, 106, 108, 109, 109A, 110, 111, etc. are selected so that the maximum amplitudes of the control signals applied to the mixer stage from these resistors are equal.

The over-all amplitude of all control frequencies is adjusted by a master gain control contact 112 adapted to slide along a resistor 114 connected at one end to ground and at another end to one end of a resistor 116, the other end of which is connected to the negative lead 72. The base of a sixth transistor 118 is connected between resistors 114 and 116. The emitter of the sixth transistor is connected to ground through a resistor 120, which includes a by-pass capacitor 122. The collector of the sixth transistor 118 is connected through the primary winding of the second transformer 54 to the negative terminal 72. Thus, the mixer stage passes the various control signal frequencies to the D.C. voltage regulator and tone modulator where the audio frequencies are superimposed on the D.C. voltage applied to the track.

The various control signal frequencies are detected by their respective receivers (as shown in FIG. 2) mounted on a train (not shown) adapted to roll along the track, and used to effect the desired control. For example, a motor speed control signal receiver 129, which includes an LC circuit 130 tuned to receive signals at the frequency of the speed oscillator 62. The LC circuit 130 includes a capacitor 132 having one side connected in series with an inductance 134 to a positive lead 135 and having its opposite side connected to the base of a seventh transistor 142, and through a resistor 144 to a negative lead 145 connected at one end to a brush 145A adapted to make sliding contact with the negative rail of the track. The other end of the negative lead 145 is connected to the collector of an eighth transistor 146, the emitter of which is connected to a lead 148, which is connected to one terminal 150 of the D.C. motor 60. One end of lead 135 is connected to a brush 153 adapted to make sliding contact with the positive rail of the track, and the other end is connected to an armature 152 in a relay 139. A resistor 154 is connected at one end to the lead 135, and at its other end to one end of a resistor 156, the other end of which is connected to the collector of the seventh transistor 142, the emitter of which is connected to the negative lead 145. A resistor 158 is connected at one end between resistors 154, 156 and at its other end to the base of the seventh transistor 142. A capacitor 160 is connected on one side to the negative lead 145, and on its other side to the point between resistors 154 and 156. The output of transistor 142 is connected through a coupling capacitor 162 to the base of a ninth transistor 164, the emitter of which is connected to the negative lead 145, and the collector of which is connected through a resistor 166 to the positive lead 135. The output of the ninth transistor 164 is coupled through a lead 168 to the base of the eighth transistor 146, which is connected through a capacitor 168A to the negative lead 145. The cathode of a diode rectifier 169 is connected to the base of the ninth transistor, and the anode of the diode 169 is connected to the negative lead 145. The amplifier stage formed by the seventh transistor 142 provides the relatively large audio frequency amplitudes required to obtain full control of the motor 60.

In the motor speed control signal receiver, the seventh transistor 142 operates as a class "A" amplifier, isolating the tuned circuit 130 from the diode rectifier 169 and the ninth transistor 164.

A motor direction control signal receiver 170 includes an LC circuit 171 tuned at the frequency output of the reversing oscillator 66. The LC circuit 171 includes a capacitor 172 connected on one side to the base of a tenth transistor 174 and on its other side through an inductance 176 to a positive lead 177 connected to the middle rail of the track by a slidable brush 177A. A resistor 178 is connected at one end to the lead 177 and at its other end to one end of a resistor 180, the other end of which is connected to the collector of the tenth transistor 174, the emitter of which is connected to a negative lead 181 connected at one end by a slidable brush 182 to the negative rail of the track, and at its other end to the emitter of an eleventh transistor 183.

The base of the tenth transistor 174 is connected through a resistor 184 to the negative lead 181, and through a resistor 185 to a point between resistors 178 and 180. A capacitor 186 is connected at one side to the negative lead 181 and at its other side to the point between resistor 178 and 180.

The output of the tenth transistor 174 is coupled through a capacitor 187 to the base of the eleventh transistor 183, which is connected to the cathode of a diode rectifier 188, the anode of which is connected to the negative lead 181. The collector of the eleventh transistor 183 is connected through a relay winding 190 to the positive lead 177. The relay winding actuates the armatures 152, 194 of relays 139, 195, respectively. Armature 194 is connected to terminal 194A of the motor 60. Contacts 196 and 197 of relays 139 and 195, respectively, are connected to one end of an armature winding 198 of the series wound D.C. motor 60. Contacts 199 and 200 of relays 139 and 195, respectively, are connected to the other end of the armature winding 198, so that actuation of the relay reverses the polarity of the armature winding and the direction of the motor 60.

To operate the circuit to drive the train motor forward, the speed control contact 96 at the phase inverter output is moved up to give the desired amplitude to the audio frequency control signal received by the motor speed control signal receiver. It is assumed that the armatures of the relay are in the positions shown in the drawing so that the motor is driven in a forward direction in accordance with the D.C. current permitted to flow by the eighth transistor 146 through the armature of the motor. Maximum speed is obtained with the contact 96 in the uppermost position. Zero speed is obtained by setting the contact 96 at the mid point of resistor 92.

To run the train motor in the reverse direction, the contact 96 is moved down from the mid point of resistor 92, closing microswitch 108 so that power is supplied to the reverse oscillator, which sends out a control signal at a frequency that is received by the motor direction control signal receiver. The direction control signal is amplified and applied to the relay winding 190, causing the relay armatures 152 and 194 to move down and engage contacts 196 and 200, respectively. This reverses the polarity of the D.C. voltage applied to the motor armature, and causes the motor to run in a reverse direction. The reverse speed is increased as the contact 96 is moved down on resistor 92.

It will be apparent that other control signals at various frequencies can be imposed on the operating voltage on the track to effect a multitude of control operations. The circuit of this invention can also be utilized for remote operation of other devices, such as the control of traffic lights on city streets. For example, the circuit can be used to synchronize traffic lights for smooth traffic flow. The various receivers provide a large number of control channels, so that a single telephone line or similar pair of wires, running the length of the street to be controlled, provides all of the required interconnections.

Such an arrangement is illustrated in FIG. 3. A control panel 210, which is located at a central control station, such as a police station, is connected to a plurality of traffic light control panels 211, 211A (only two of which are shown) by a pair of conductors 212. Traffic light control panel 211 includes a first traffic light 213, and the other includes a second traffic light 214.

The central control station includes a D.C. voltage source 216 connected to a voltage regulator and tone modulator 218, such as the type shown in the lower portion of FIG. 1. Alternating current signals of different frequencies $F_1$ and $F_2$ are applied from sources 220 and 222, respectively, through spaced arcuate commutator segments 224, 226, respectively. A rotor 228, which is driven by a variable speed motor (not shown) at a desired speed, intermittently rides on the segments 224 and 226 to apply the alternating current signals of frequency $F_1$ and $F_2$ successively to the voltage regulator and tone modulator 218, the output of which is a direct current with frequencies $F_1$ and $F_2$ superimposed on it.

The control of the first traffic light 213 includes first and second control signal receivers 230 and 232 tuned to receive frequencies $F_1$ and $F_2$, respectively. Each of the tuned circuits 230 and 232 can be similar to the tuned circuit 170 shown in the lower portion of FIG. 2, except that they are tuned to receive different frequencies. The first receiver 230 energizes a solenoid 234 which actuates armatures 236 and 238. The second receiver 232 energizes a solenoid 240 which operates armatures 242 and 243.

The first traffic light 213 includes green, yellow, and red lights, G, Y, and R, respectively, connected on a common side to a power lead 244, which is connected to one terminal of an A.C. source 246, the other terminal of which is connected to a power lead 248. The opposite sides of the green, yellow, and red lights are connected to armatures 236, 243, and 242, respectively.

Contacts 250, 252, and 254, are adapted to be engaged by armatures 238, 236, and 242, respectively, and are connected to power lead 248. Contact 256 is adapted to be engaged by armature 243 and is connected to armature 238.

The operation of the circuit to control the first traffic light 213 will be understood from the following explanation. With the rotor 228 in the central control station in contact with commutator segment 226, as shown in FIG. 3, alternating current signal $F_2$ is superimposed on the D.C. voltage and the combined signals are applied over the lines 212. Tuner 232 receives the signal so that solenoid 240 is energized and armatures 242 and 243 are pulled down into the position shown in FIG. 3 so that armature 242 engages contact 254, and armature 243 is out of engagement with contact 256. This connects the red light to the power source 246, the green and yellow lights being turned off, since the solenoid 234 is not energized and the armatures 238 and 236 are in the upper positions shown in FIG. 3.

When the rotor 228 in the central control station is in transit between spaced commutator segments 224 and 226, the solenoids 234 and 240 are not energized, armature 238 engages contact 250, and at the same time armature 243 moves up to engage contact 256 so that the yellow light is connected to the power source 246, and the green and the red lights are not.

When the rotor 228 contacts segment 224, alternating current signal $F_1$ is applied through lines 212 to energize the solenoid 234 so that armature 236 moves down against contact 252 and armature 238 moves out of engagement with contact 250. Solenoid 240 is not energized so that armature 242 moves up away from contact 254, and armature 243 moves up against contact 256. With the circuit in this condition, the green light is turned on and the yellow and red lights are off.

Thus, the red, yellow, and green lights are energized under the control of the rotor 228 and the segments 224 and 226. The time during which each light is actuated is controlled by the speed of the rotation of the rotor 228, or by the relative lengths of the commutator segments, which may be adjusted by conventional means.

The rotor 228 may be coupled to one or more additional rotors and commutator arrangements such as rotor 250 and segments, 252, 253, connected to sources 254, 254A of alternating frequency $F_3$ and $F_4$, respectively. With such an arrangement, the rotor 250 is used to control the second traffic light 214 which includes first and second tuners 255, 256, first and second solenoids 258, 260, armatures 262, 264, 266, and 268, and contacts 270, 272, 274, and 276, all of which are connected to the second traffic light in a manner identical to that described with respect to the control circuit for the first traffic light, except that the first and second tuners 255, 256 are tuned to frequencies $F_3$ and $F_4$, respectively.

The control and phasing of the traffic lights with respect to each other is obtained by adjusting the angular position of the rotors 228 and 250 in the central control station. Of course, as many lights as may be desired can be controlled simultaneously from the central control station.

I claim:

1. A circuit for controlling the supply of electric power to a load, the circuit comprising a source of operating voltage, means connecting the operating voltage to the load, a variable impedance, means connecting the impedance to control the flow of electric power through the load, a source of control voltage of a frequency different from that of the operating voltage, means for superimposing the control voltage on the operating voltage, means selectively responsive to the control voltage for changing the impedance of the variable impedance and thereby control the power flowing through the load, and means for changing the amplitude of the control voltage.

2. A circuit for controlling the supply of electric power to a plurality of loads, the circuit comprising a source of operating voltage, means connecting the operating voltage to the loads, a separate variable impedance for each load, means connecting each impedance to control the flow of electric power through a respective load, a separate source of control voltage of a frequency different from that of the operating voltage for each load, means for superimposing the control voltages on the operating voltage, and separate means selectively responsive to a respective control voltage for changing the impedance of each variable impedance and thereby independently control the power flowing through each load.

3. A circuit according to claim 2 which includes means for equalizing the maximum amplitude of the voltages delivered by the control voltage sources.

4. A circuit for controlling the supply of electric power to a first load, the circuit comprising a source of operating voltage, means connecting the operating voltage to the first load, a first variable impedance, means connecting the first impedance to control the flow of electric power through the first load, an input circuit adapted to receive a first control voltage of a frequency different from that of the operating voltage, means for superimposing the first control voltage on the operating voltage, means selectively responsive to the first control voltage for changing the impedance of the first variable impedance and thereby control the power flowing through the first load, a second load, means connecting the operating voltage to the second load, a second variable impedance, means connecting the second impedance to control the flow of power through the second load, an input circuit adapted to receive a second control voltage of a frequency different from that of the first control voltage and the operating voltage, means for superimposing the second control voltage on the operating voltage, and means selectively responsive to the second control voltage for changing the impedance of the second variable impedance and thereby control the power flowing through the second load.

5. A circuit for controlling the supply of electric power to a load, the circuit comprising a source of direct current operating voltage, means connecting the operating voltage to the load, a variable impedance, means connecting the impedance to control the flow of electric power through the load, a source of alternating current control voltage in the audio frequency range of a frequency different from that of the operating voltage, means for superimposing the control voltage on the operating voltage, and means selectively responsive to the control voltage for changing the impedance of the variable impedance and thereby control the power flowing through the load.

6. A circuit for controlling the supply of electric power to a load, the circuit comprising a source of operating voltage, means connecting the operating voltage to the load, a transistor as a variable impedance in series with the load and the source of operating voltage to control the flow of electric power through the load, a source of control voltage of a frequency different from that of the operating voltage, means for superimposing the control voltage on the operating voltage, and means selectively responsive to the control voltage for changing the impedance of the variable impedance and thereby control the power flowing through the load.

7. A circuit according to claim 2 which includes means for simultaneously controlling the supply of electric power to a plurality of loads.

8. A circuit for controlling the supply of electric power to an electric motor adapted to drive a train on an electrically conductive track, the circuit comprising a source of operating voltage, means connecting the operating voltage to the track, means connecting the motor to the track, a variable impedance, means connecting the impedance to control the flow of electric power through the motor, a source of control voltage of a frequency different from that of the operating voltage, means for superimposing the control voltage on the operating voltage to the track, means for changing the amplitude of the control voltage and means selectively responsive to the amplitude of the control voltage for changing the impedance of the variable impedance and thereby control the power flowing through the motor.

References Cited in the file of this patent

UNITED STATES PATENTS

| | | |
|---|---|---|
| 2,622,542 | Bonanno | Dec. 23, 1952 |
| 2,743,678 | Hibbard | May 1, 1956 |